US011492821B2

(12) United States Patent
Papenroth et al.

(10) Patent No.: US 11,492,821 B2
(45) Date of Patent: Nov. 8, 2022

(54) EMERGENCY EXIT SYSTEM

(71) Applicant: Airbus Operations GmbH, Hamburg (DE)

(72) Inventors: Uwe Papenroth, Hamburg (DE); Hermann Benthien, Hamburg (DE); Torsten Witt, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 761 days.

(21) Appl. No.: 16/440,435

(22) Filed: Jun. 13, 2019

(65) Prior Publication Data
US 2019/0383062 A1  Dec. 19, 2019

(30) Foreign Application Priority Data

Jun. 14, 2018  (DE) .......................... 102018114242.0

(51) Int. Cl.
*E05B 65/10* (2006.01)
*B64C 1/14* (2006.01)
*B64C 1/34* (2006.01)
(52) U.S. Cl.
CPC ........ *E05B 65/1033* (2013.01); *B64C 1/1461* (2013.01); *B64C 1/1423* (2013.01); *B64C 1/34* (2013.01); *E05Y 2900/502* (2013.01)
(58) Field of Classification Search
CPC . E05B 65/1033; B64C 1/1461; B64C 1/1423; B64C 1/34; E05Y 2900/502
See application file for complete search history.

(56) References Cited

U.S. PATENT DOCUMENTS

| 3,802,125 | A |   | 4/1974  | Baker |
|---|---|---|---|---|
| 4,047,441 | A |   | 9/1977  | Kellogg |
| 4,125,235 | A |   | 11/1978 | Fitzgerald et al. |
| 5,064,147 | A |   | 11/1991 | Noble et al. |
| 5,931,415 | A |   | 8/1999  | Lingard et al. |
| 2010/0059628 | A1 | * | 3/2010 | Kobayashi ............ B64C 1/1438 244/129.5 |

(Continued)

FOREIGN PATENT DOCUMENTS

DE        69817911 T2    5/2004
DE     102015224449 A1    6/2017

(Continued)

OTHER PUBLICATIONS

Berman Search Report; priority document, dated Nov. 6, 2018.

*Primary Examiner* — Rodney A Bonnette
(74) *Attorney, Agent, or Firm* — Greer, Burns & Crain, Ltd.

(57) ABSTRACT

An emergency exit system comprising a first primary structure frame, a second primary structure frame extending substantially parallel to the first primary structure frame, a door opening arranged between the first primary structure frame and the second primary structure frame, and a door shiftable substantially parallel to the first primary structure frame and the second primary structure frame between a closed position and an open position. In the closed position, the door closes the door opening. In the open position, the door opens up the door opening. At least one of the primary structure frames comprises a primary structure guide element for guiding the door when the door is shifted between the closed position and the open position.

16 Claims, 12 Drawing Sheets

(56) References Cited

U.S. PATENT DOCUMENTS

| | | | |
|---|---|---|---|
| 2016/0245006 A1* | 8/2016 | Joussellin | E05D 13/006 |
| 2017/0129584 A1* | 5/2017 | Da Silva | B64F 5/40 |
| 2017/0158305 A1 | 6/2017 | Werthmann | |
| 2019/0315448 A1* | 10/2019 | Chavez | E06B 7/2318 |

FOREIGN PATENT DOCUMENTS

| | | | |
|---|---|---|---|
| EP | 2460719 A1 | 6/2012 | |
| EP | 3165445 A1 | 5/2017 | |

* cited by examiner

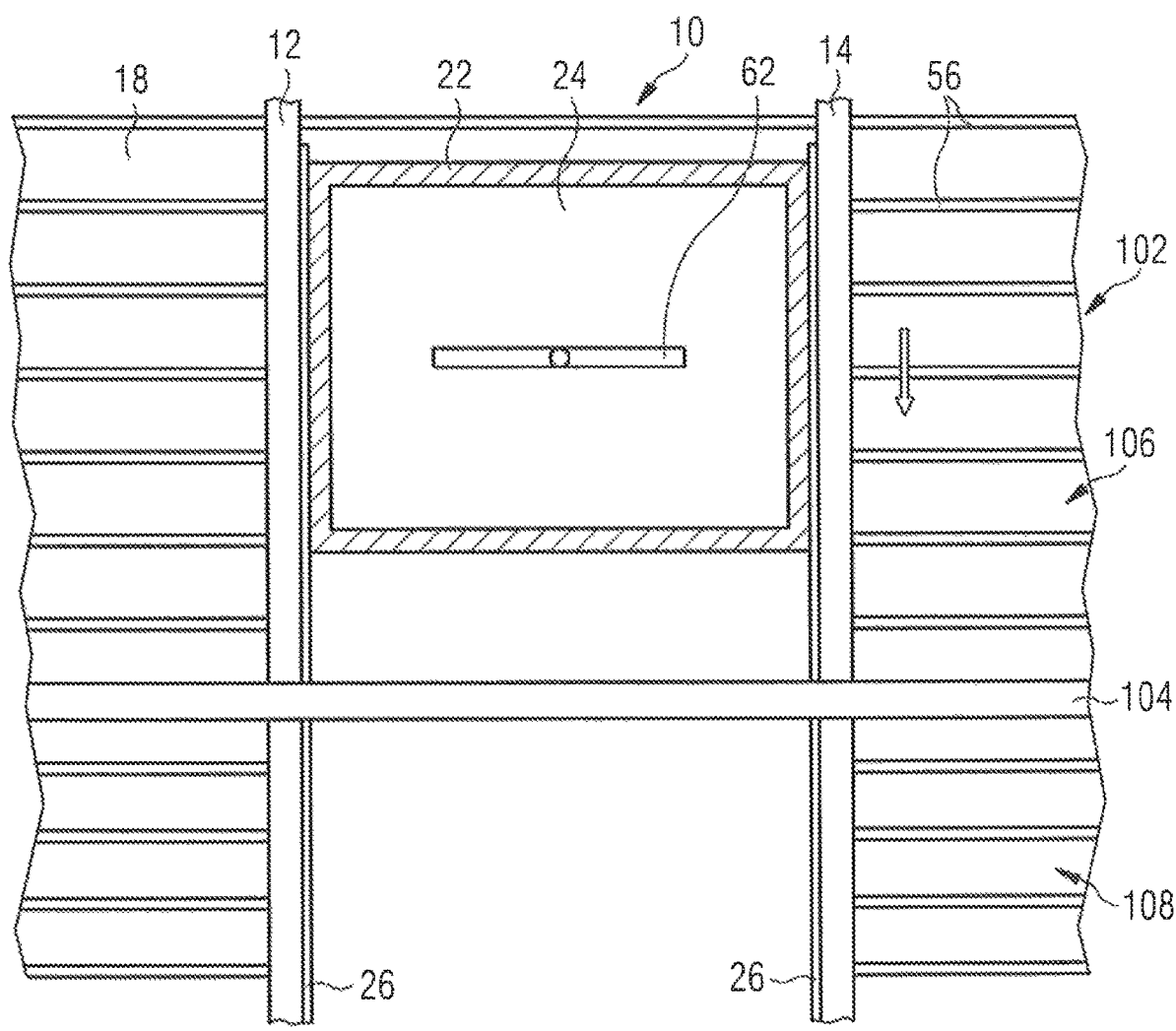

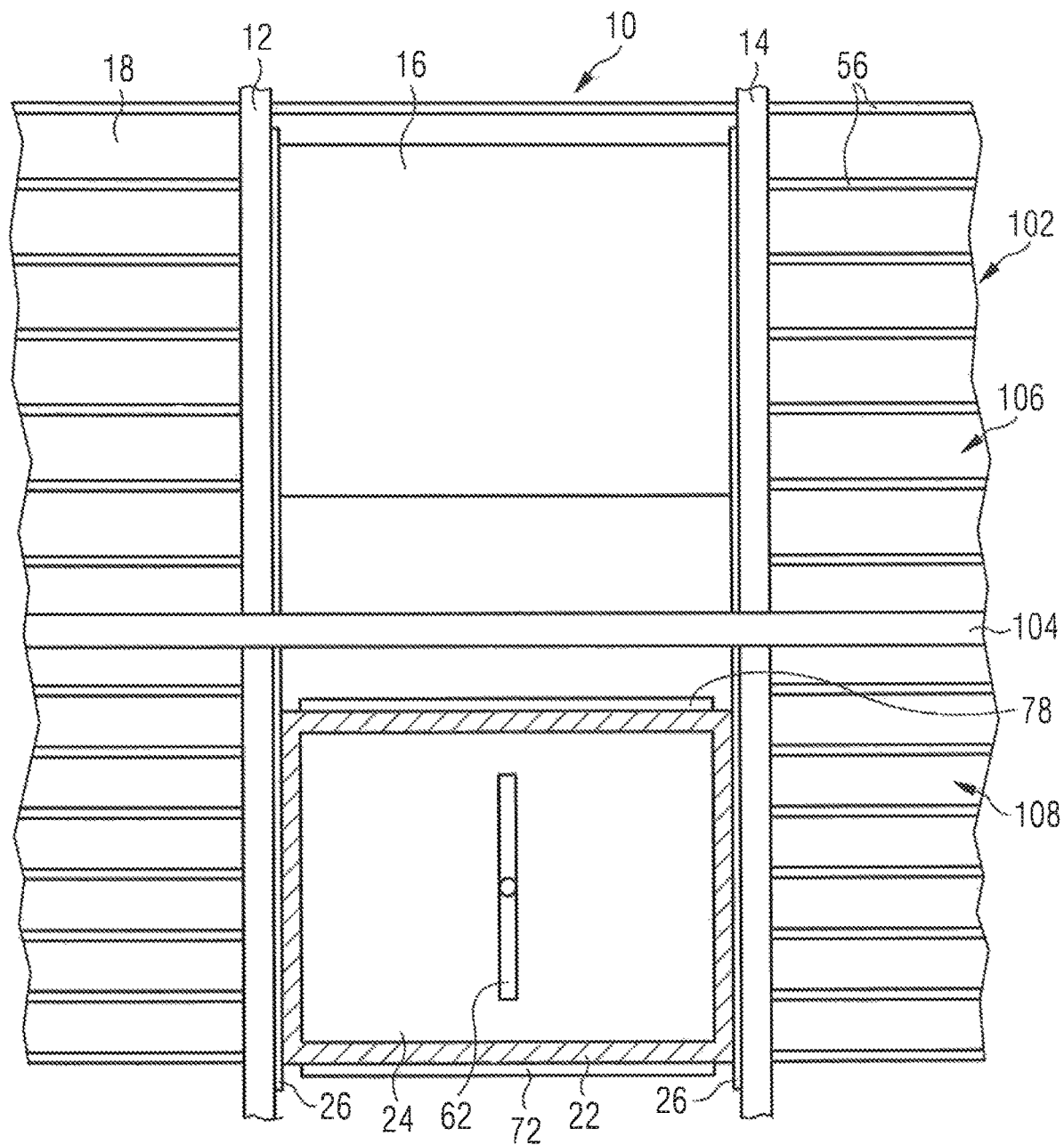

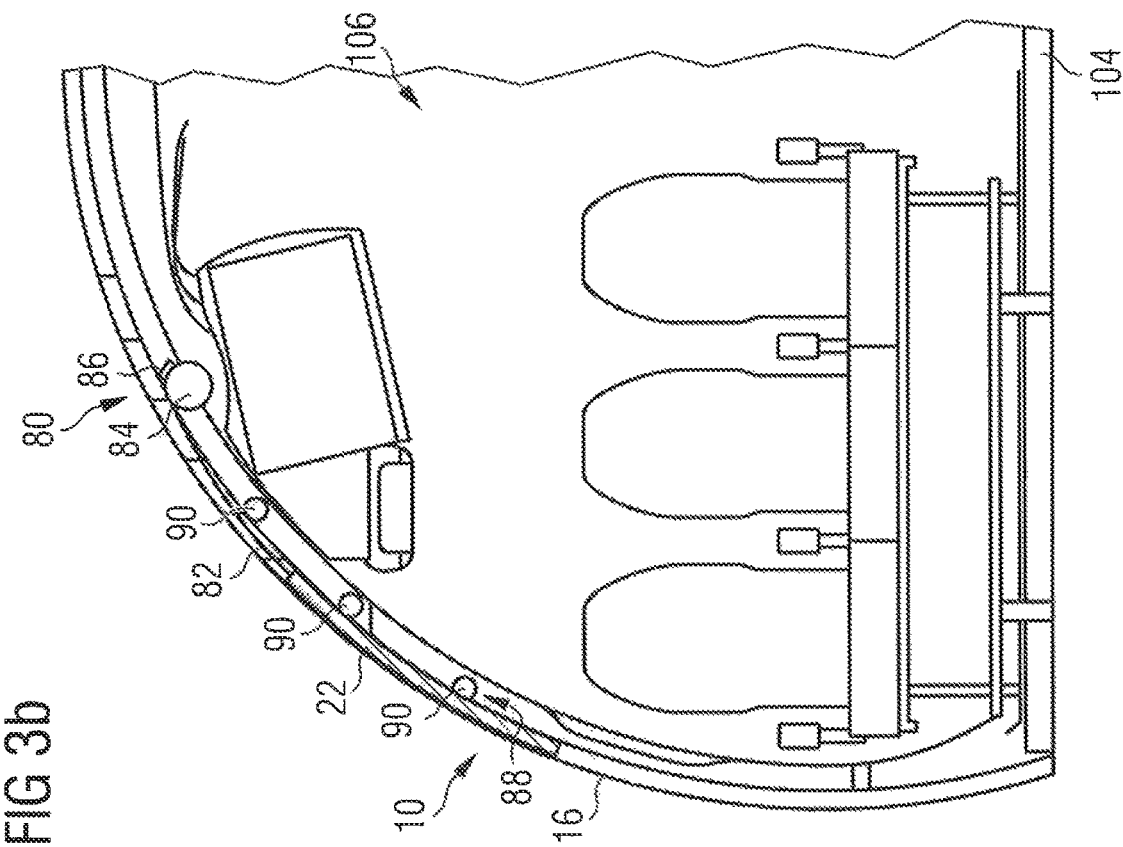
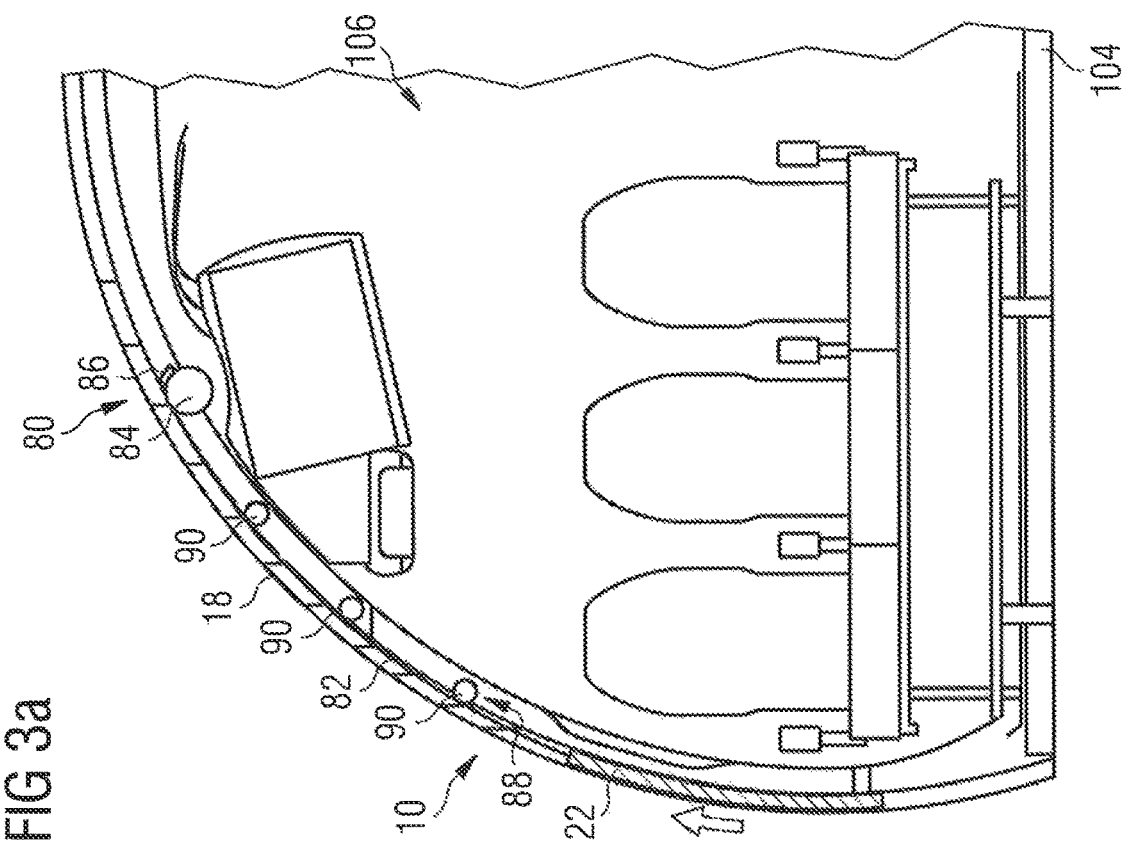

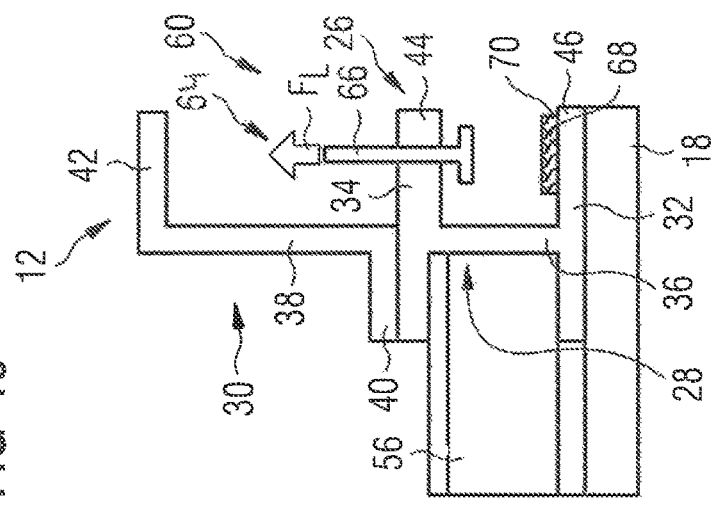
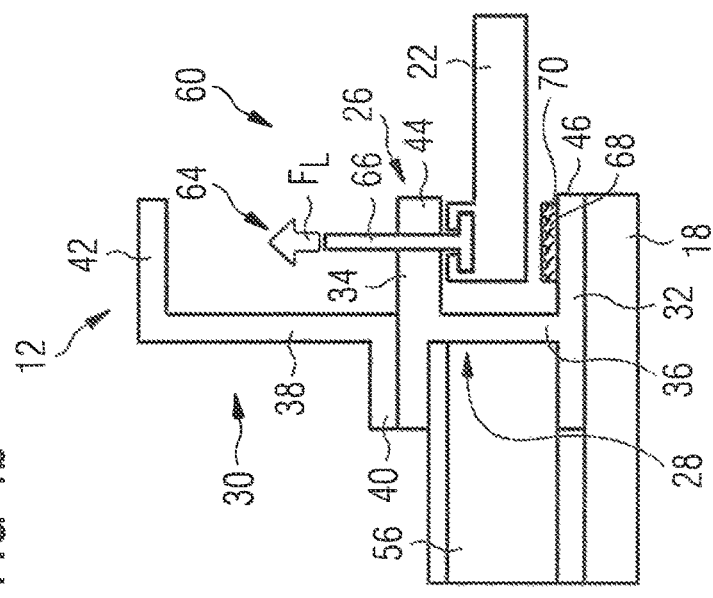
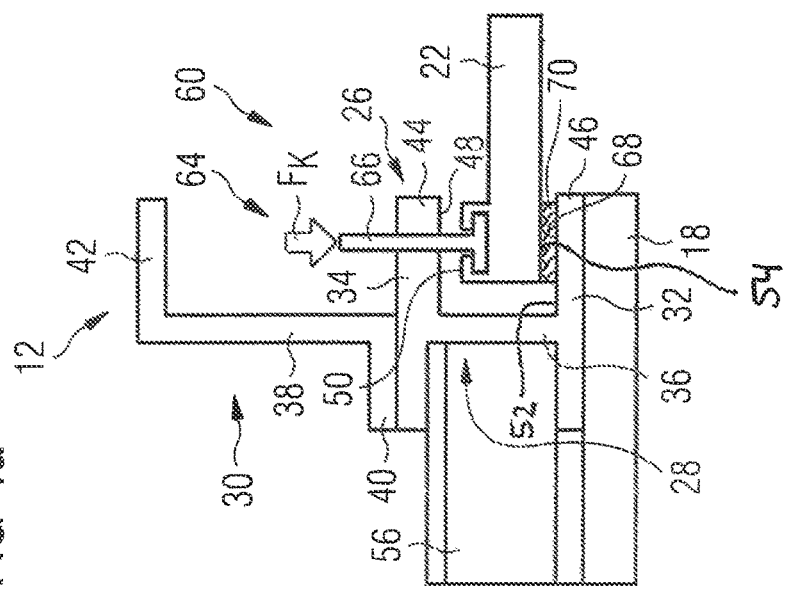

EMERGENCY EXIT SYSTEM

CROSS-REFERENCES TO RELATED APPLICATIONS

This application claims the benefit of the German patent application No. 102018114242.0 filed on Jun. 14, 2018, the entire disclosures of which are incorporated herein by way of reference.

FIELD OF THE INVENTION

The invention relates to an emergency exit system which is suitable for use in an aircraft, in particular a commercial aircraft. Furthermore, the invention relates to an aircraft equipped with such an emergency exit system.

BACKGROUND OF THE INVENTION

Modern commercial aircraft are conventionally provided with a plurality of emergency exits which are opened only in an emergency situation in order to enable people located in the aircraft to exit from the aircraft. The emergency exits can be, for example, what are referred to as over-wing exits which are provided in the aircraft fuselage above the wings and, in the opened state, open up an exit route from the aircraft cabin onto the wing. Such emergency exits are conventionally provided with doors which can be opened by a flight attendant or passenger in the emergency situation. Customary emergency exit doors conventionally comprise a lever, the actuation of which opens a closure mechanism. After the closure mechanism is opened, the door can be separated manually from the aircraft fuselage and stowed in the aircraft cabin. As an alternative thereto, the door can be thrown out of the aircraft through the door opening which is now free.

DE 10 2015 224 449 A1 discloses a door unit for an emergency exit door of an aircraft, the door unit comprising a rotary lever, a door holder coupled rotatably to one end of the rotary lever, a door fastened to the door holder, and a drive unit for rotating the rotary lever. During a movement from its closed position into its open position, the rotary lever moves an axis of rotation of the door holder first of all into an interior of the aircraft and subsequently out of the interior of the aircraft. Finally, the door holder with the door fastened thereto is rotated about the axis of rotation, as a result of which the door is pivoted upwards and a door opening is opened up.

SUMMARY OF THE INVENTION

The invention is based on an object of providing a simply constructed, reliable emergency exit system which is suitable for use in an aircraft. Furthermore, the invention is based on the object of specifying an aircraft provided with such an emergency exit system.

An emergency exit system comprises a first primary structure frame and a second primary structure frame extending substantially parallel to the first primary structure frame. The two primary structure frames of the emergency exit system are configured, in the state of the emergency exit system mounted in an aircraft, to form part of a primary structure of the aircraft. The term "primary structure" here describes the load-bearing fuselage structure of the aircraft, which conventionally comprises a plurality of frames extending substantially parallel to one another and a plurality of stringers extending substantially parallel to one another.

A door opening is arranged between the first primary structure frame and the second primary structure frame. The door opening is formed, for example, in an aircraft outer skin which is connected to the primary structure frames. The door opening can basically have any desired shape and size, but preferably has a width which corresponds to 70 to 95% of the distance between the two primary structure frames. Furthermore, in the state of the emergency exit system mounted in an aircraft, the door opening can optionally either extend as far as a floor of an aircraft cabin or can end above the floor.

A door of the emergency exit system, which is shiftable substantially parallel to the first primary structure frame and the second primary structure frame between a closed position and an open position. In the closed position, closes the door opening. By contrast, in the open position, the door opens up the door opening. The door is shiftable upwards and/or downwards relative to the door opening.

At least one of the primary structure frames comprises a primary structure guide element for guiding the door when the door is shifted between the closed position and the open position. Both the first primary structure frame and the second primary structure frame are preferably provided with a primary structure guide element for guiding the door when the door is shifted between the closed position and the open position. When the door is shifted between the closed position and the open position, the door is then guided on both sides and consequently particularly safely and reliably.

The term "primary structure guide element" is understood here as meaning a guide element which fulfils the dual function firstly of guiding the movement of the door between the closed position and the open position, but secondly of also taking on load-supporting primary structure tasks. In other words, in the same manner as the two primary structure frames of the emergency exit system, the primary structure guide element is configured, in the state of the emergency exit system mounted in an aircraft, to form part of the primary structure of the aircraft. The emergency exit system is therefore distinguished by a simple construction and a high degree of functional reliability.

The primary structure frame comprising the primary structure guide element can be formed in a single part. For example, the primary structure frame can be provided along at least one portion with a guide element, which is formed in an integrated manner, i.e., integrally, with the primary structure frame, for guiding the door as the door is shifted between the closed position and the open position. As an alternative thereto, however, the primary structure frame comprising the primary structure guide element can also be formed in two parts along at least one portion and can comprise a first component comprising the primary structure guide element and a second component connected to the first component. In particular, the first component and the second component are connected to each other in a load-transmitting manner in order to ensure that the two components forming the two-part primary structure frame can take on corresponding load-supporting tasks of the primary structure of an aircraft.

The first component comprising the primary structure guide element can have an H-shaped cross section, i.e., can comprise two support portions which extend substantially parallel to each other and are connected to each other by a connecting portion extending substantially perpendicularly to the support portion. In the state of the emergency exit system mounted in an aircraft, an outer surface of a first support portion can be connected, for example, to an outer skin of the aircraft. By contrast, an outer surface of a second support portion can be connected to the second component of the two-part primary structure frame.

By contrast, the second component of the two-part primary structure frame can comprise a connecting portion which extends substantially perpendicularly to the support portions of the first component adjacent to the connecting portion of the first component. Support portions of the second component can extend from opposite surfaces of the connecting portion of the second component in opposite directions substantially perpendicularly to the connecting portion, wherein one of the support portions preferably rests on the outer surface of the second support portion of the first component.

The primary structure guide element preferably comprises at least one guide rail which extends from an inner surface of the primary structure frame, the inner surface facing the door, in the direction of the door. When the door is shifted between the closed position and the open position, a guide surface formed on the guide rail can then interact with a surface of an edge portion of the door. In a preferred embodiment of the emergency exit system, the primary structure guide element comprises two guide rails which extend substantially parallel to each other and can be formed, for example, by corresponding, mutually opposite regions of the support portions of the first component of a two-part primary structure frame. By contrast, on a side facing away from the door, mutually opposite regions of the support portions of the first component can be provided for connection to at least one stringer and can be shaped and dimensioned, for example, in such a manner that they can receive an end portion of at least one stringer between them.

The emergency exit system preferably furthermore comprises a releasable securing mechanism which is configured to secure the door in the closed position. The securing mechanism can be actuable automatically and/or manually. For example, the securing mechanism can comprise a rotatable actuating lever which can be actuated manually in order, in an emergency situation, to release the securing mechanism and thereby to permit the door to be shifted from the closed position into the open position. The securing mechanism is, in particular, a mechanism satisfying the corresponding safety regulations for emergency exit systems in commercial aircraft. For example, the securing mechanism can comprise a clamping device which is configured to force the door in the direction of a clamping portion, which is formed, in particular, on the guide element, in order to secure the door in the closed position.

Alternatively or additionally thereto, the securing mechanism can comprise a locking hook which is connected to the door and is configured to interact with a structurally fixed, complementary locking hook. The structurally fixed, complementary locking hook is preferably connected rigidly to a primary structure component. For example, the complementary locking hook can be attached to the first primary structure frame, to the second primary structure frame or to a stringer. If desired, the securing mechanism can also comprise a plurality of locking hooks connected to the door, and a corresponding number of complementary locking hooks.

The locking hook connected to the door and the structurally fixed, complementary locking hook can be brought into engagement with each other by an above-described clamping device or another suitable device. Additionally or alternatively thereto, it is, however, also conceivable that, in the state of the emergency exit system mounted in an aircraft, the locking hook which is connected to the door and the structurally fixed, complementary locking hook are brought into engagement with each other in the flight mode of the aircraft by means of the cabin pressure acting on an inner surface of the door, the inner surface facing an interior of the aircraft. By means of the interaction of the locking hook which is connected to the door with the structurally fixed, complementary locking hook, the door can be brought into a position in which it is capable of supporting peripheral loads which act on the door in particular in the flight mode of the aircraft.

The clamping device can comprise a bearing element which is arranged between the clamping portion of the guide element and a surface portion of the door, the surface portion interacting with the clamping portion. The surface portion of the door, the surface portion interacting with the clamping portion, can be, for example, an edge portion of an outer surface of the door, the outer surface facing the outer skin of the aircraft in the state of the emergency exit system mounted in an aircraft. The bearing element can be composed of an elastic material and can act as a damping element and/or as a sealing element.

As already mentioned, the door of the emergency exit system can be shiftable upwards and/or downwards relative to the door opening. In particular, the door can be shiftable from the closed position downwards substantially parallel to the first primary structure frame and the second primary structure frame into the open position in a manner driven by gravity. In the state of the emergency exit system mounted in an aircraft, the door in the open position is then arranged, for example, in an underfloor region of the aircraft. In such a configuration of the emergency exit system, the securing mechanism which holds the door in the closed position merely has to be released in order to initiate the shifting of the door from the closed position into the open position. The emergency exit system is then configured and can be operated particularly simply and has few components needing maintenance.

Alternatively or additionally thereto, the emergency exit system can also be provided with a lifting mechanism which is configured to shift the door upward substantially parallel to the first primary structure frame and the second primary structure frame relative to the door opening into the open position. In the state of the emergency exit system mounted in an aircraft, the door in the open position is then arranged, for example, in a, or adjacent to a, ceiling region of the aircraft.

The lifting mechanism can comprise, for example, a spring element which prestresses the door resiliently into the open position. In such a configuration of the lifting mechanism, the securing mechanism which keeps the door in the closed position merely has to be released in order to initiate the shifting of the door from the closed position into the open position. The spring element is preferably dimensioned in such a manner that the spring force provided by it is sufficient in order to keep the door in the open position after it has been shifted into the open position. This makes it possible to dispense with an additional mechanism for securing the door in the open position.

Alternatively or additionally thereto, the lifting mechanism can comprise a tension cable which is connected to the door and is configured to be wound up onto a cable drum as the door is being shifted from the closed position into the open position. Conversely, the tension cable is preferably unwound from the cable drum as the door is being shifted from the open position into the closed position. The spring element can be coupled to the cable drum for winding up or unwinding the tension cable, i.e., the cable drum can be designed in the form of a cable drum which is prestressed resiliently in a winding-up direction. If desired or required, the lifting mechanism can comprise a plurality of tension cables which are connected to the door and can be wound up onto one or more cable drums or can be unwound from one or more cable drums.

In a preferred embodiment of the emergency exit system, the tension cable is guided by a guide device. The guide device for guiding the tension cable can comprise, for example, at least one guide roller which can be fitted above the door opening to an inner surface of the first primary structure frame and/or of the second primary structure frame, the inner surface facing the door opening. Additionally or alternatively thereto, it is, however, also conceivable to use the guide element for guiding the door as it is being shifted between the closed position and the open position additionally also for guiding the tension cable.

In a preferred embodiment, the emergency exit system furthermore comprises a stop element which is configured to interact with the door and to prevent a further shifting of the door relative to the door opening when the door has reached the open position. By means of the stop element, a shifting of the door beyond a desired open position is prevented. The provision of a stop element is advantageous in particular whenever the door is shiftable downwards into the open position in a manner driven by gravity since the stop element then prevents a gravity-driven shifting of the door beyond the open position.

A damping element is preferably connected to the stop element and is configured to damp a stopping of the shifting movement of the door when the door has reached the open position. The damping element prevents an abrupt, uncontrolled stopping of the door when the door has reached the open position. The damping element can comprise, for example, a spring which is connected to the stop element, and therefore the stop element upon first contact with the door being shifted into the open position first of all moves together with the door over a defined distance, in the process brakes the shifting movement of the door and finally ensures controlled stopping of the shifting movement of the door.

As explained above, for the shifting of the door upwards into the open position, the lifting mechanism can be provided with a spring element, the spring force of which keeps the door in the open position after the door has been shifted into the open position. Additionally or alternatively thereto, however, a locking device can also be provided which is configured to lock the door in the open position. Such a locking device is appropriate, in particular, for use in an emergency exit system in which the door is shiftable downwards into the open position in a manner driven by gravity, but also a door which is shiftable upwards into the open position by means of a lifting mechanism can be secured by means of a locking device against an undesirable return movement into the closed position.

The locking device can comprise, for example, a locking element which is prestressed resiliently into a locking position and enters into contact with a corresponding edge region of the door as soon as the door has reached the open position. When a door is shiftable downwards into the open position in a gravity-driven manner, the locking element preferably interacts with an upper edge region of the door and thereby prevents an undesirable return movement of the door into the closed position, the return movement being caused, for example, by the damping element or by a movement of an aircraft provided with the emergency exit system. When a door is shiftable upwards into the open position by means of a lifting mechanism, the locking element preferably interacts with a lower edge region of the door and thereby prevents a, for example, gravity-driven return movement of the door into the closed position.

In a particularly preferred embodiment of the emergency exit system, the door has a window which takes up, in particular, 70 to 90% of the area of the door. The cabin of an aircraft provided with the emergency exit system can then be provided in a visually particularly attractive manner with large windows.

The door can be formed in multiple parts and can comprise an upper part, a lower part and a central part arranged between the upper part and the lower part. The upper part and the lower part of the door can then be connected to the corresponding design for attaching the door to, for example, a securing mechanism for securing the door in the closed position, a lifting mechanism for shifting the door upwards into the open position, etc., while the central part preferably comprises as few functional components as possible. The door can then be adapted in a particularly simple manner to various design requirements. For example, the door can then be configured to be longer or shorter by simple interchanging of the central part.

The door can be in the form of a flexible rolling door. Such a rolling door can comprise, for example, a plurality of slats extending substantially parallel to one another and a plurality of cords connecting the slats to one another. In particular, whenever the door is in the form of a flexible rolling door, the securing mechanism for securing the door in the closed position preferably comprises a locking hook which is connected to the door and interacts with a structurally fixed, complementary locking hook in order to secure the door in the closed position.

A door which is in the form of a flexible rolling door can be configured in such a manner that, as it is being shifted from the closed position into the open position, it can be wound up onto a receiving roller. The receiving roller can be in the form of a receiving roller which is prestressed resiliently in a winding-up direction. The door which is in the form of a flexible rolling door is then automatically moved into the open position by the resilient prestressing force of the receiving roller as soon as the securing mechanism for securing the door in the closed position is released.

When required, i.e., in particular, whenever the door is in the form of a flexible rolling door, the emergency exit system can furthermore comprise a pressure-tight membrane which is applied to an inner surface of the door and, in the state of the emergency exit system mounted in an aircraft, faces an interior of the aircraft. The effect achieved by the pressure-tight membrane is that, in the flight mode of an aircraft provided with the emergency exit system, the rolling door is pressed by the cabin pressure into a position in which the rolling door, in particular, the cords connecting the slats to one another, and the locking hooks of the securing mechanism for securing the door in the closed position are capable of absorbing peripheral loads.

The emergency exit system can furthermore comprise an activatable blocking element which is configured in order, during a movement of the door from the closed position into the open position, to prevent the displacement of the door parallel to the first primary structure frame and the second primary structure frame in such a manner that, in the state of the emergency exit system mounted in an aircraft, the door drops out of the aircraft. For example, the blocking element in the activated state can be configured in order to close a receiving space for receiving the door in the open position, and therefore the shifting of the door into the receiving space is prevented and instead the door drops out of the aircraft. In a particularly preferred embodiment, the blocking element is in the form of an inflatable emergency chute.

An aircraft comprises an emergency exit system described above.

In order to permit the above-described, guided shifting of the door of the emergency exit system upwards and/or downwards relative to the door opening, the primary structure of the aircraft preferably does not have any stringers in the shifting path of the door. For stabilization purposes, an outer skin of the aircraft in the region of the shifting path of the door, in which no stringers are provided, can be provided with a reinforcing layer which can be applied to an inner surface of the aircraft outer skin, the inner surface facing an interior of the aircraft. A surface of the reinforcing layer, which surface faces the door during the shifting between the closed position and the open position, is preferably designed to be as flat as possible so as not to obstruct the shifting of the door. Furthermore, use can be made of a longitudinal pipe of a sealing module of the aircraft, the longitudinal pipe extending substantially parallel to a longitudinal axis of the aircraft, for stabilizing the primary structure of the aircraft.

BRIEF DESCRIPTION OF THE DRAWINGS

Preferred embodiments of the invention will now be explained in more detail with reference to the attached schematic drawings, of which FIGS. 1a to e show a first embodiment of an emergency exit system suitable for use in an aircraft, wherein FIGS. 1a, c, d each show sectional views in a plane perpendicular to a longitudinal axis of the aircraft, while FIGS. 1b and e each show top views, as viewed from an interior of the aircraft, FIGS. 4a to c show detailed views of a primary structure guide element and part of a securing mechanism of an emergency exit system.

DETAILED DESCRIPTION OF THE PREFERRED EMBODIMENTS

Figure 10:
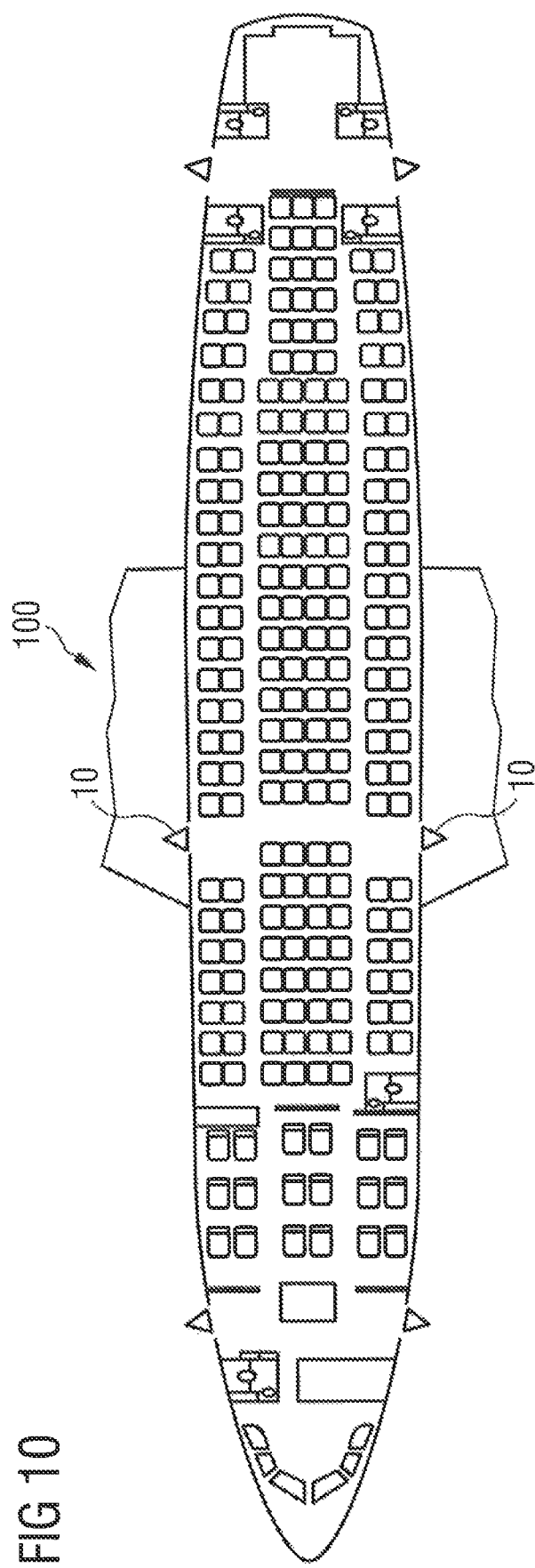
FIG. 10 shows an aircraft, the over-wing exits of which are formed by an emergency exit system according to FIGS. 1a to c, according to FIG. 2, according to FIGS. 3a and b, according to FIGS. 5a to c and/or according to FIG. 9.

FIGS. 1a to e, 2, 3a and b, 5a to c and 9 show various embodiments of an emergency exit system 10 suitable for use in an aircraft. The emergency exit system 10 can be used as an over-wing exit in an aircraft 100 shown in FIG. 10.

The first embodiment of the emergency exit system that is shown in FIGS. 1a to e will be explained in more detail below. The emergency exit system 10 comprises a first primary structure frame 12 and a second primary structure frame 14 extending substantially parallel to the first primary structure frame 12, see, in particular, FIG. 1b. The two primary structure frames 12, 14 of the emergency exit system 10 are configured in order, in the state of the emergency exit system 10 mounted in an aircraft 100, as is illustrated in FIGS. 1a to e, to form part of a primary structure of the aircraft 100.

Figure 1A:
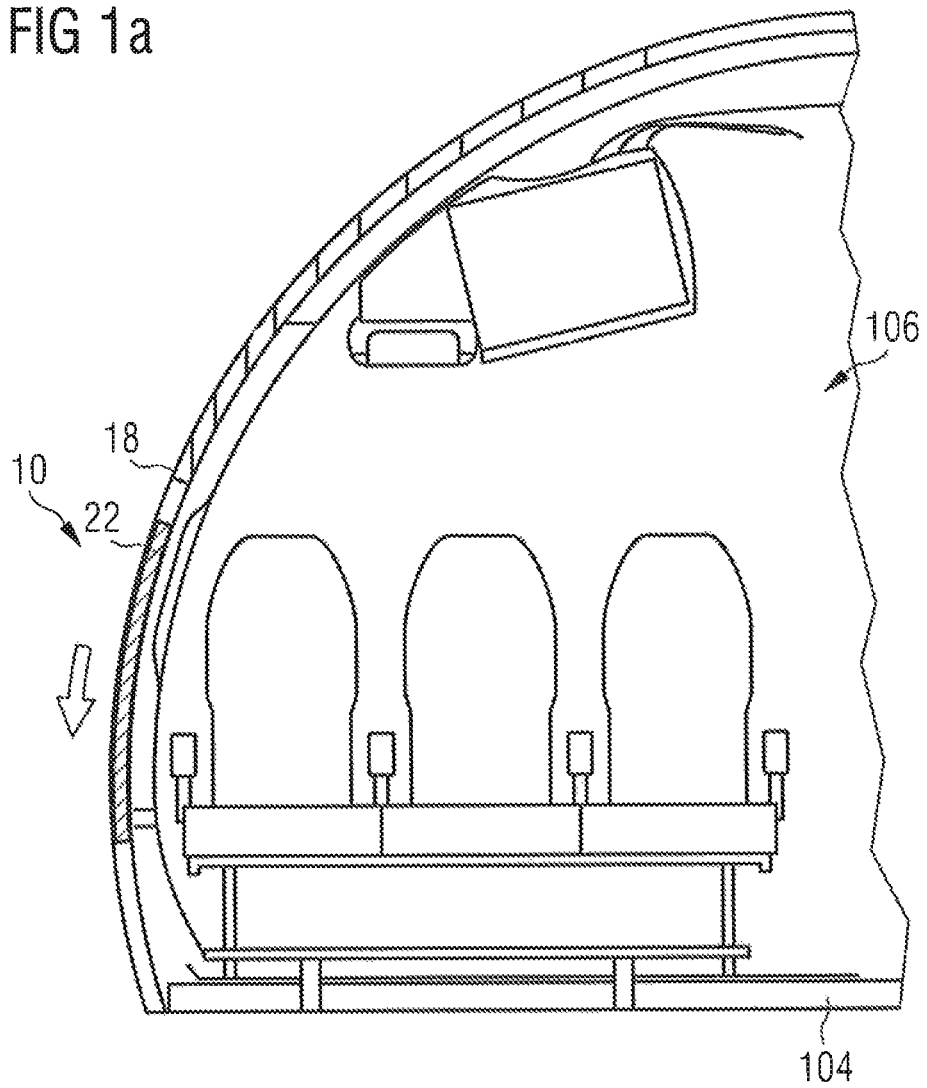

A door opening 16, see, in particular, FIG. 1e, is arranged between the first primary structure frame 12 and the second primary structure frame 14. In particular, the door opening 16 is formed in an outer skin 18 of the aircraft 100, the outer skin being connected to the primary structure frames 12, 14, and, in the exemplary embodiment of the emergency exit system 10 that is shown here, has a width which corresponds to approximately 95% of the distance between the two primary structure frames 12, 14. In the embodiment of the emergency exit system 10 that is illustrated in FIGS. 1a to e, the door opening 16 ends above a floor 104 which is provided in a cabin 102 of the aircraft 100 and, for example, separates a passenger cabin region 106 from an underfloor region 108 of the aircraft 100. The door opening 16 is accordingly formed in a portion of the aircraft outer skin 18 that bounds the passenger cabin region 106.

Figure 1C:
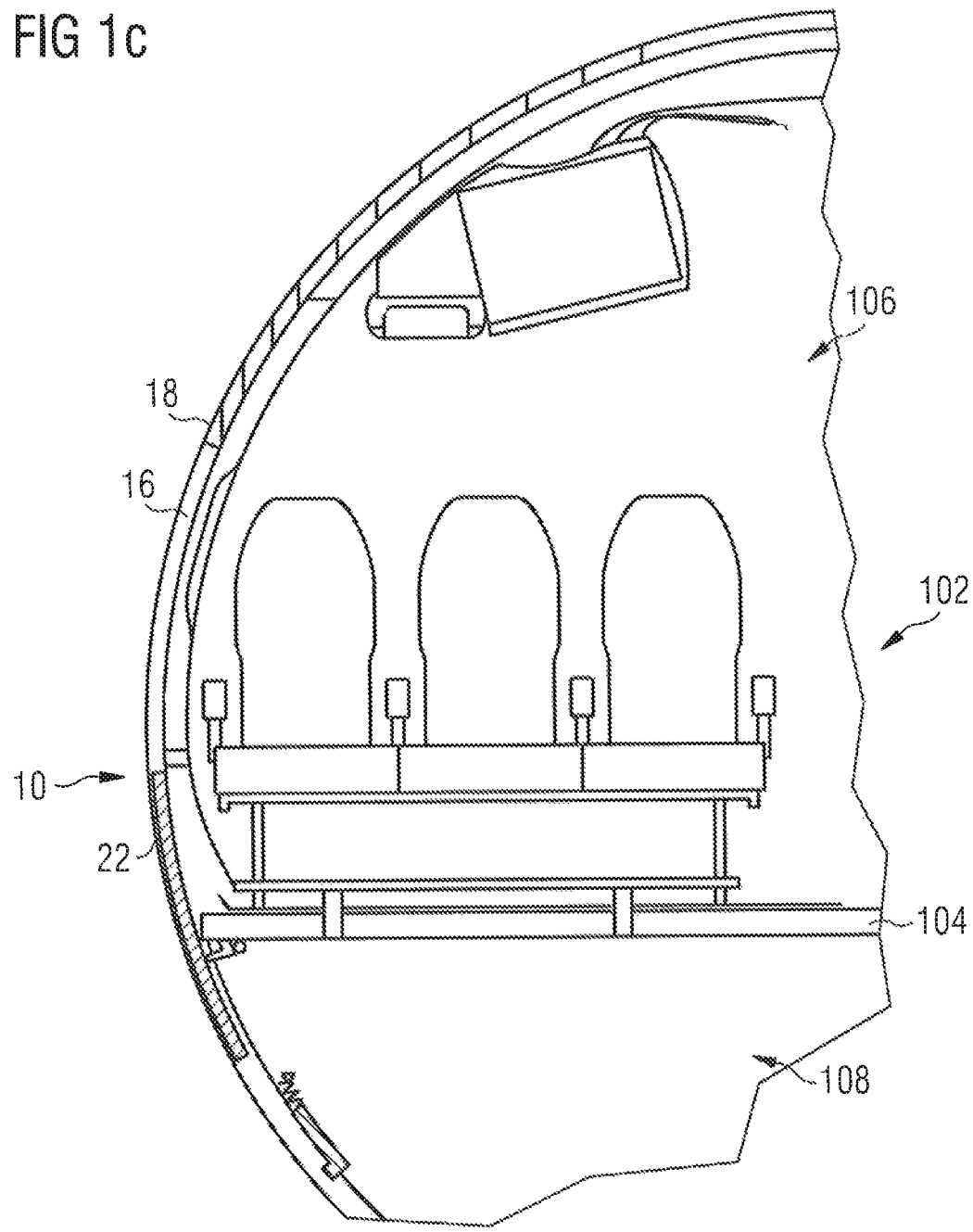

The emergency exit system 10 furthermore comprises a door 22 which is shiftable substantially parallel to the primary structure frames 12, 14 between an open position and a closed position. In the closed position illustrated in FIGS. 1a and b, the door 22 closes the door opening 16. By contrast, in the open position shown in FIGS. 1d and e, the door 22 opens up the door opening 16. FIG. 1c shows an operating state of the emergency exit system 10 in which the door 22 is precisely in the movement from the closed position into the open position. As is apparent from a comparison of FIGS. 1a and b with FIGS. 1c to e, in the embodiment of the emergency exit system 10 that is illustrated in FIGS. 1a to e, the door is shiftable downwards relative to the door opening 16 into the underfloor region 108 of the aircraft cabin 102.

The door 22 comprises a window 24 which takes up a predominant part of the area of the door 22, in particular, approximately 70 to 90% of the area of the door 22. This results, in the passenger cabin 106, in the visually attractive impression of a large window which is merely bounded by a narrow holding frame.

At least one of the two primary structure frames 12, 14 comprises a primary structure guide element 26 which serves to guide the door 22 as the door is being shifted between the closed position and the open position. In the embodiment of the emergency exit system 10 that is illustrated in FIGS. 1a to e, both the first primary structure frame 12 and the second primary structure frame 14 are provided with a primary structure guide element 26. The primary structure guide element 26 fulfils a dual function—firstly it guides the movement of the door 22 between the closed position and the open position, but secondly it also takes on load-supporting tasks of the aircraft primary structure, i.e., a portion of the loads to be absorbed by the primary structure frames 12, 14 are supported by the primary structure guide elements 26.

A detailed view of the primary structure frame 12 and of the associated primary structure guide element 26 is illustrated in FIGS. 4a to c which each show sectional views in a plane parallel to the floor 104 separating the passenger cabin region 106 from the underfloor region 108. The primary structure frame 14 and its associated primary structure guide element 26 have a corresponding mirror-symmetrical design. In principle, the primary structure guide element 26 can be formed in a manner integrated with the primary structure frame 12. However, in the exemplary arrangement illustrated in FIGS. 4*a* to *c*, the primary structure frame 12 comprising the primary structure guide element 26 is formed in two parts along the portion in which the primary structure frame 12 supports the primary structure guide element 26, and comprises a first component 28 comprising the primary structure guide element 26, and a second component 30 connected in a load-transmitting manner to the first component 28.

In the exemplary arrangement shown in FIGS. 4*a* to *c*, the first component 28 comprising the primary structure guide element 26 has an H-shaped cross section and comprises a first support portion 32 and a second support portion 34 extending substantially parallel to the first support portion 32. The two support portions 32, 34 are connected to each other by a connecting portion 36 extending substantially perpendicularly to the support portions 32, 34. An outer surface of the first support portion 32 is connected to the outer skin 18 of the aircraft 100 while an outer surface of the second support portion 34 is connected to the second component 30 of the two-part primary structure frame 12.

The second component 30 of the two-part primary structure frame 12 comprises a connecting portion 38 which extends substantially perpendicularly to the support portions 32, 34 of the first component 28 adjacent to and in alignment with the connecting portion 36 of the first component 28. In the region of the two ends of the connection portion 38, a first support portion 40 and a second support portion 42 extend from opposite surfaces of the connecting portion 38 in opposite directions substantially perpendicularly to the connecting portion 38. The first support portion 40 of the second component 30 rests on the outer surface of the second support portion 32 of the first component 28.

As is best clear from the illustrations according to FIGS. 1*b*, 1*e* and 4*a* to *c*, each primary structure guide element 26 comprises a first guide rail 44 which extends from an inner surface of the corresponding primary structure frame 12, 14, the inner surface facing the door 22, in the direction of the door 22. In the exemplary embodiment of a primary structure frame 12 formed in two parts, shown in FIGS. 4*a* to *c*, the first guide rail 44 is formed by a portion of the second support portion 34 of the first component 28 of the primary structure frame 12. Furthermore, each primary structure guide element 26 comprises a second guide rail 46 (see FIGS. 4*a* to *c*) which extends parallel to the first guide rail 44 from the inner surface of the corresponding primary structure frame 12, 14, which inner surface faces the door 22, in the direction of the door 22. In the exemplary embodiment of a primary structure frame 12 formed in two parts, shown in FIGS. 4*a* to *c*, the second guide rail 46 is formed by a portion of the first support portion 32 of the first component 28 of the primary structure frame 12.

When the door 22 is shifted between the closed position and the open position, a guide surface 48 formed on the first guide rail 44 interacts with a surface 50 of an edge portion of the door 22. In a corresponding manner, a guide surface 52 formed on the second guide rail 46 interacts with a further surface 54 of the edge portion of the door 22, the further surface lying opposite the surface 50. By contrast, on a side facing away from the door 22, mutually opposite regions of the support portions 32, 34 of the first component 28 receive a plurality of stringers 56, which are arranged substantially parallel to one another, between them.

The emergency exit system 10 furthermore comprises a releasable, automatically and/or manually actuable securing mechanism 60 which meets the corresponding safety regulations for emergency exit systems in commercial aircraft and is configured to secure the door 22 in the closed position. In the exemplary embodiment of an emergency exit system 10 that is illustrated in FIGS. 1*a* to *e* and 4*a* to *c*, the securing mechanism 60 comprises a rotatable actuating lever 62 which is arranged in the region of an inner surface of the door 22, the inner surface facing the interior of the passenger cabin 106. The actuating lever 62 can be actuated manually in order, in an emergency situation, to release the securing mechanism 60 and thereby to permit shifting of the door 22 from the closed position into the open position.

In the arrangement illustrated in FIGS. 1*a* to *e* and 4*a* to *c*, the securing mechanism 60 furthermore comprises a clamping device 64 with a clamping element 66. As long as the actuating lever 62 is in its unactuated position (see FIG. 1*b*), the clamping element 66 of the clamping device 64 forces the door 22, as illustrated in FIG. 4*a* by the arrow FK, in the direction of a clamping portion 68 formed on the guide element 26, i.e. on the second guide rail 46 of the guide element 26, and thereby secures the door 22 in the closed position. The clamping portion 68 interacts here with a surface portion of the door 22, which surface portion is formed by an edge portion of an outer surface of the door 22, the outer surface facing the outer skin 18 of the aircraft 100. A bearing element 70 which is composed of an elastic material and can act as a damping element and/or as a sealing element is arranged between the clamping portion 68 and the surface portion of the door 22 that interacts with the clamping portion 68.

If, by contrast, the actuating lever 62 is rotated into its actuating position (see FIG. 1*e*), the clamping element 66, as illustrated by the arrow FL in FIGS. 4*b* and 4*c*, is shifted in the direction of the interior of the passenger cabin 106. Accordingly, the securing mechanism 60 is released by the fact that the edge portion of the outer surface of the door 22, the outer surface facing the outer skin 18 of the aircraft 100, is no longer pressed against the clamping portion 68 or the bearing element 70 formed on the second guide rail 46 of the guide element 26. As a result, the door 22 can be shifted from the closed position into the open position.

Figure 1D:
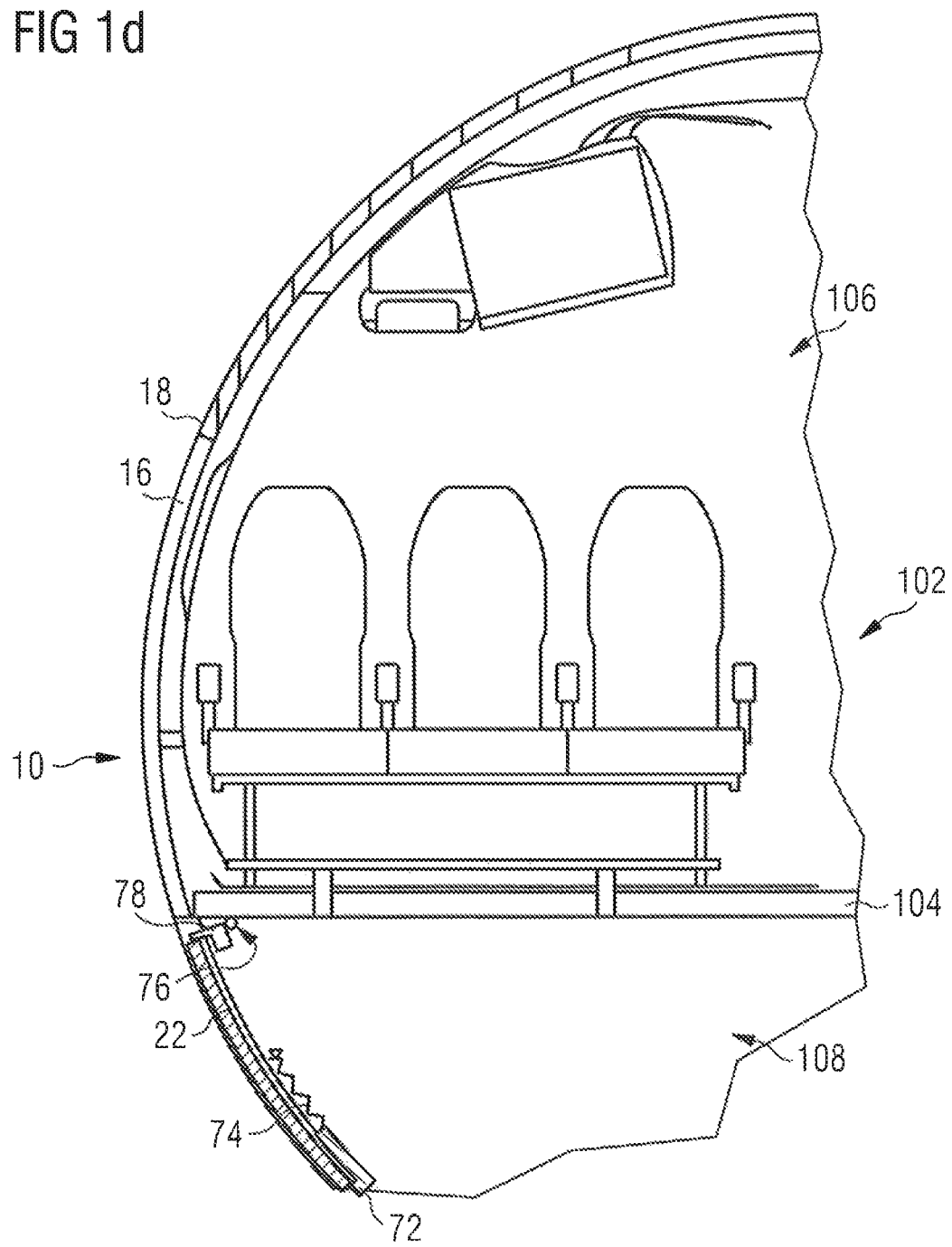

In particular, in the embodiment of the emergency exit system 10 that is shown in FIGS. 1*a* to *e* and 4*a* to *c*, the door 22 is shiftable downwards substantially parallel to the first primary structure frame 12 and the second primary structure frame 14 relative to the door opening 16 from the closed position shown in FIGS. 1*a* and *b* and 4*a* and *b* into an open position shown in FIGS. 1*d* and *e* in a manner driven by gravity. In the open position, the door 22 is arranged in the underfloor region 108 of the aircraft cabin 102. FIG. 1*c* illustrates an operating state of the emergency exit system 10, in which the door 22 is precisely in its movement from the closed position into the open position.

In order to permit shifting of the door 22 relative to the door opening 16, the primary structure of the aircraft 100 does not have any stringers in the shifting path of the door 22. The outer skin 18 of the aircraft 100 in the region of the shifting path of the door 22, in which no stringers are provided, is therefore provided with a reinforcing layer (not illustrated specifically in the figures) which is applied to an inner surface of the aircraft outer skin 18, the inner surface facing the interior of the aircraft cabin 102.

In order to prevent shifting of the door 22 beyond the desired open position, the emergency exit system 10 furthermore comprises a stop element 72 which enters into contact with a lower edge of the door 22 when the door 22 has reached the open position. A damping element 74 is connected to the stop element 72 and is configured to damp a stopping of the shifting movement of the door 22 when the door has reached the open position, and thereby to prevent an abrupt, uncontrolled stopping of the door 22 when the door has reached the open position. The damping element 74 comprises a spring connected to the stop element 72, and therefore the stop element 72 upon first contact with the door 22 being shifted into the open position first of all moves together with the door 22 over a defined distance, in the process brakes the shifting movement of the door 22 and finally ensures controlled stopping of the shifting movement of the door 22.

Finally, the emergency exit system 10 comprises a locking device 76 which is configured to lock the door 22 in the open position and thereby to prevent an undesirable return movement of the door 22 into the closed position. The locking device comprises a locking element 78 which is prestressed resiliently into a locking position and enters into contact with an upper edge region of the door 22 as soon as the door 22 has reached the open position.

Figure 2:
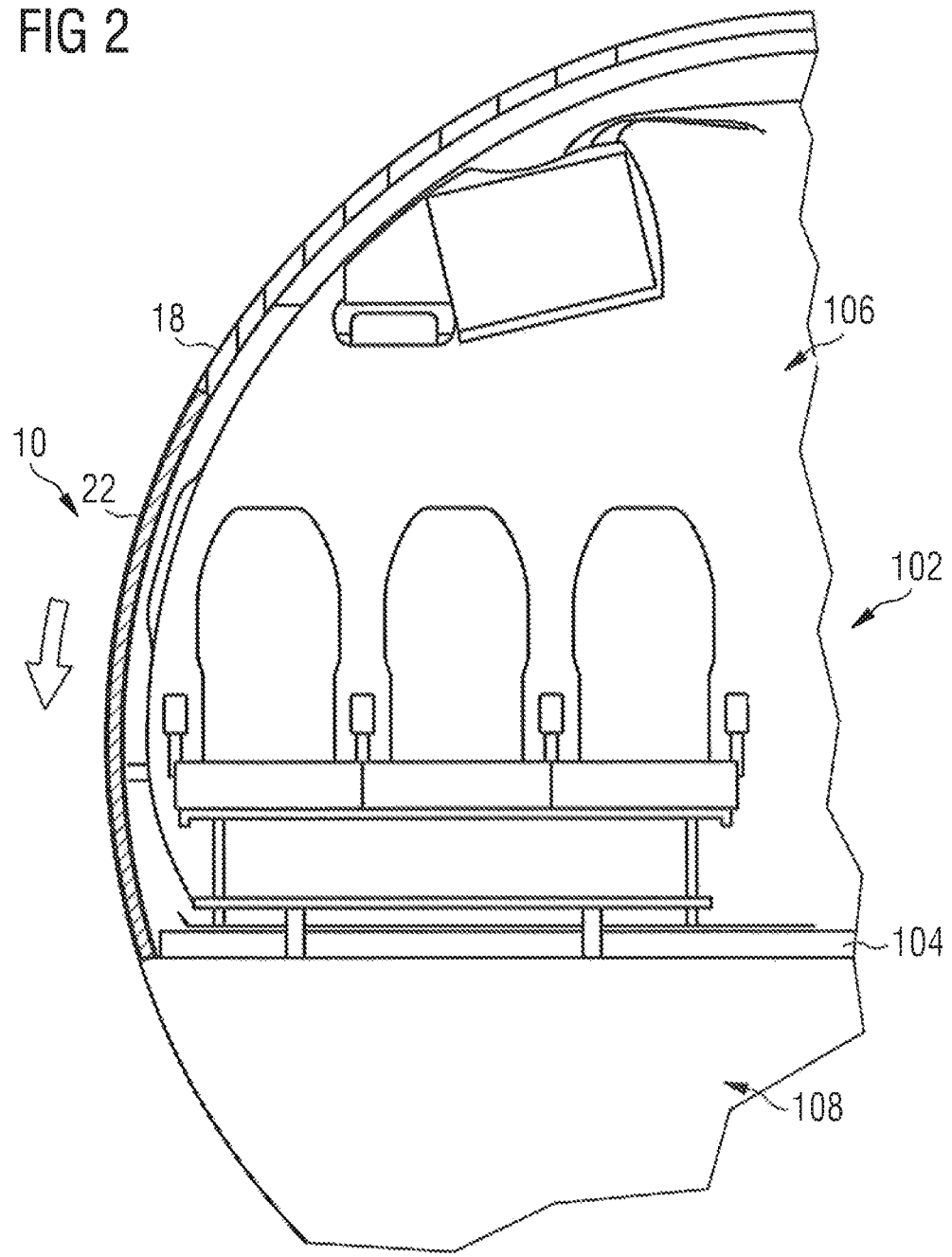
FIG. 2 shows a second embodiment of an emergency exit system suitable for use in an aircraft, FIGS. 3a and b show a third embodiment of an emergency exit system suitable for use in an aircraft.

The embodiment of an emergency exit system 10 that is shown in FIG. 2 differs from the arrangement illustrated in FIGS. 1a to e in that the door opening 16 and the door 22 extend as far as the floor 104 of the aircraft cabin 102. Furthermore, the door 22 either does not comprise any window or merely comprises a window which is smaller than 70 to 90% of the area of the door 22. Otherwise, the design and the function of the emergency exit system 10 shown in FIG. 2 correspond to the design and the function of the arrangement illustrated in FIGS. 1a to e.

The embodiment of an emergency exit system 10 that is shown in FIGS. 3a and b differs from the arrangement illustrated in FIGS. 1a to e in that the door 22 is shiftable upwards from the closed position substantially parallel to the first primary structure frame 12 and the second primary structure frame 14 relative to the door opening 16 into the open position by means of a lifting mechanism 80. In the open position, the door 22 is arranged adjacent to a sealing region of the aircraft cabin 102. The lifting mechanism 80 comprises a tension cable 82 which is connected to the door 22 and is wound up onto a cable drum 84 as the door 22 is shifted from the closed position shown in FIG. 3a into the open position shown in FIG. 3b. The cable drum 84 is pretensioned in a resilient manner in a winding-up direction by means of a spring element 86, and therefore the door 22 is automatically drawn out of the closed position into the open position by the resilient prestressing force of the spring element 86 as soon as the securing mechanism 60 is released.

The tension cable 82 is guided by a guide device 88. The guide device 88 comprises a plurality of guide rollers 90 which are attached above the door opening 16 to inner surfaces of the first and/or the second primary structure frame 12, 14, the inner surfaces facing the door opening 16. The spring element 86 is dimensioned in such a manner that the spring force provided by it is sufficient to keep the door 22 in the open position after the door has been shifted into the open position. If desired, however, the emergency exit system 10 can also be provided with an alternative or additional locking device for locking the door 22 in the open position. Otherwise, the design and the function of the emergency exit system 10 shown in FIGS. 3a and b correspond to the design and the function of the arrangement illustrated in FIGS. 1a to e.

Figure 5C:
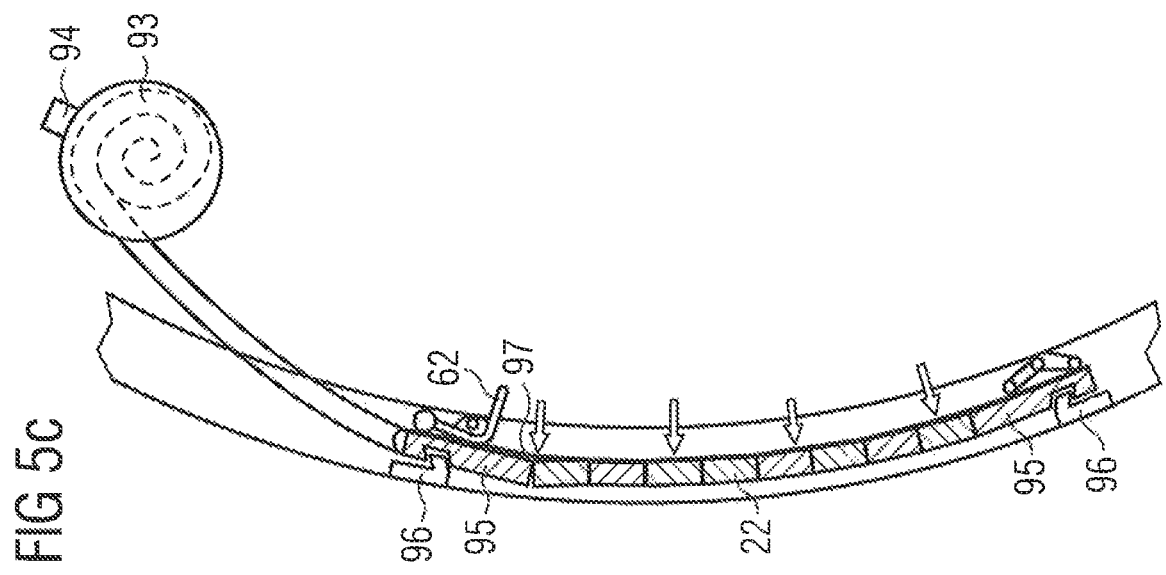
FIGS. 5a to c show a fourth embodiment of an emergency exit system suitable for use in an aircraft.
Figure 5B:
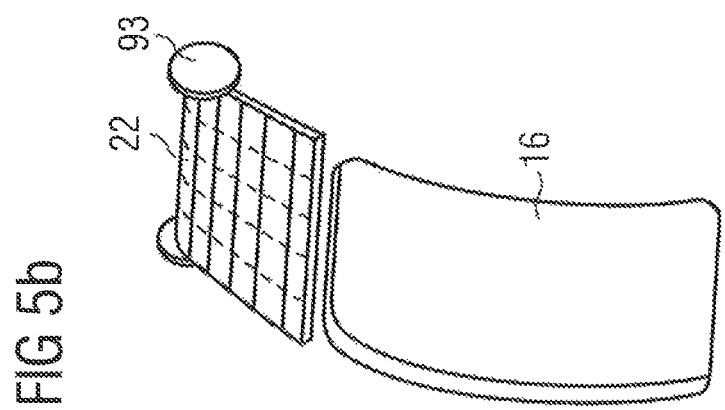
Figure 5A:
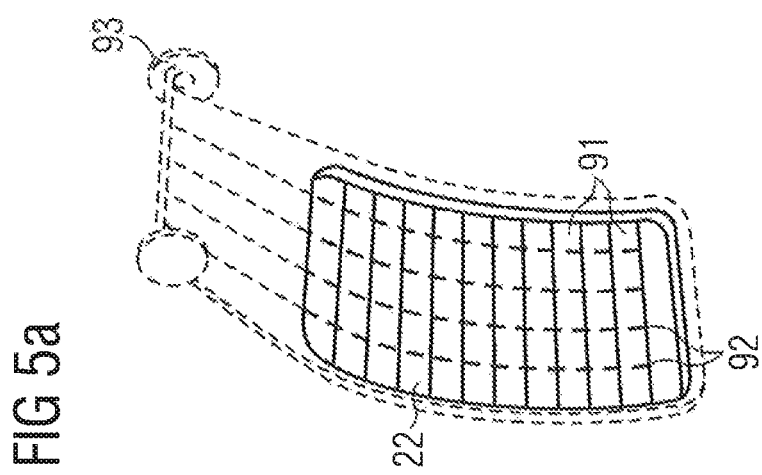

The embodiment of an emergency exit system 10 that is shown in FIGS. 5a to c differs from the arrangement illustrated in FIGS. 3a and b in that the door 22 is in the form of a flexible rolling door. In particular, the door 22 comprises a plurality of slats 91 extending substantially parallel to one another and a plurality of cords 92 connecting the slats 91 to one another. During the shifting from the closed position shown in FIGS. 5a and c into the open position shown in FIG. 5b, the door 22 is wound up onto a receiving roller 93. In a similar manner as the cable drum 84 in the embodiment of the emergency exit system 10 that is shown in FIGS. 3a and b, the receiving roller 93 is also prestressed in a winding-up direction by a spring element 94, and therefore the door 22 is automatically moved into the open position by the resilient prestressing force applied by the spring element 94 as soon as the securing mechanism 60 for securing the door 22 in the closed position is released.

Figure 6:
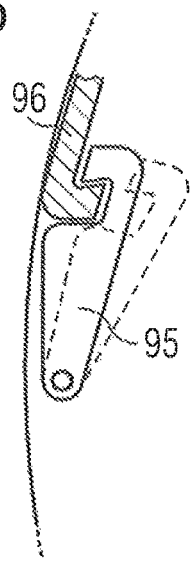
FIG. 6 shows a detailed view of a further securing mechanism for securing a door of an emergency exit system in the closed position.

In the arrangement according to FIGS. 5a to c, the securing mechanism 60 for securing the door 22 in the closed position comprises two locking hooks 95 which are connected to the door 22 and each interact with a structurally fixed, complementary locking hook 96 in order to secure the door 22 in the closed position, see FIGS. 5c and 6. Finally, the emergency exit system 10 comprises a pressure-tight membrane 97 which is applied to an inner surface of the door 22, the inner surface facing the interior of the passenger cabin 106. The effect achieved by the pressure-tight membrane 97 is that, in the flight mode of the aircraft 100, the door 22 which is in the form of a flexible rolling door is pressed by the cabin pressure into a position in which the door 22, in particular the cords connecting the slats 91 to one another, and the locking hooks 95, 96 of the securing mechanism 60 are capable of absorbing peripheral loads.

As is apparent from FIGS. 7a to d and 8a to c, the door 22 is formed in multiple parts and comprises an upper part 98a, a lower part 98b and a central part 98c arranged between the upper part and the lower part. The upper part 98a and the lower part 98b of the door 22 are provided with the corresponding locking hooks 95 of the securing mechanism 60 while the central part 98c does not comprise any functional component. As a result, the door 22 can be configured to be longer or shorter by simple interchanging of the central part 98c. Furthermore, as is apparent from a comparison of FIGS. 7a to d and 8a to c, the width of the door 22 can be varied as desired by widening the slats 91 and providing additional cords 92.

Figure 7A:
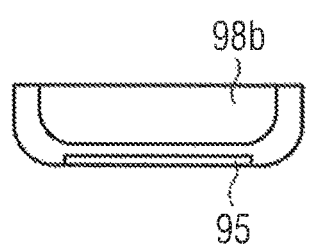
FIGS. 7a to e show detailed views of a door of the emergency exit system according to FIGS. 5a to c, FIGS. 8a to c show detailed views of an alternative door of the emergency exit system according to FIGS. 5a to c.
Figure 7B:
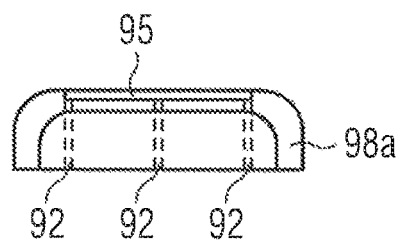
Figure 7C:
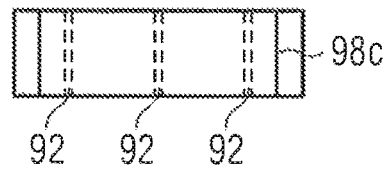
Figure 7D:
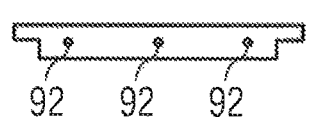
Figure 7E:
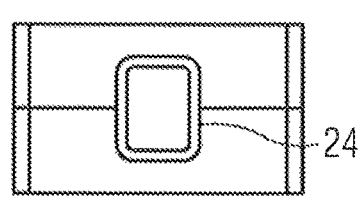
Figure 8A:
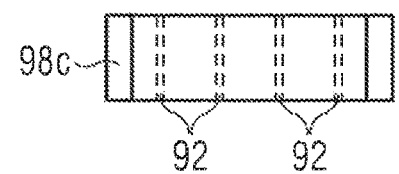
Figure 8B:
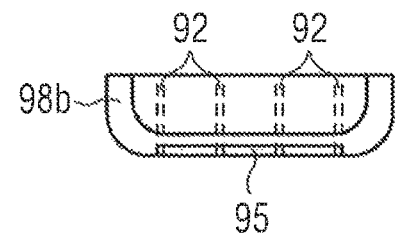
Figure 8C:
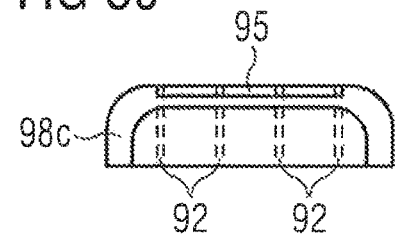

As is clear from FIG. 7e, even a door 22 which is in the form of a flexible rolling door can be provided with a window 24. The window 24 is then composed of a correspondingly flexible material in order not to obstruct an unhindered rolling up of the door 22 onto the receiving roller 93. Otherwise, the design and the function of the emergency exit system 10 shown in FIGS. 5a to c correspond to the design and the function of the arrangement illustrated in FIGS. 3a and b.

Figure 9:
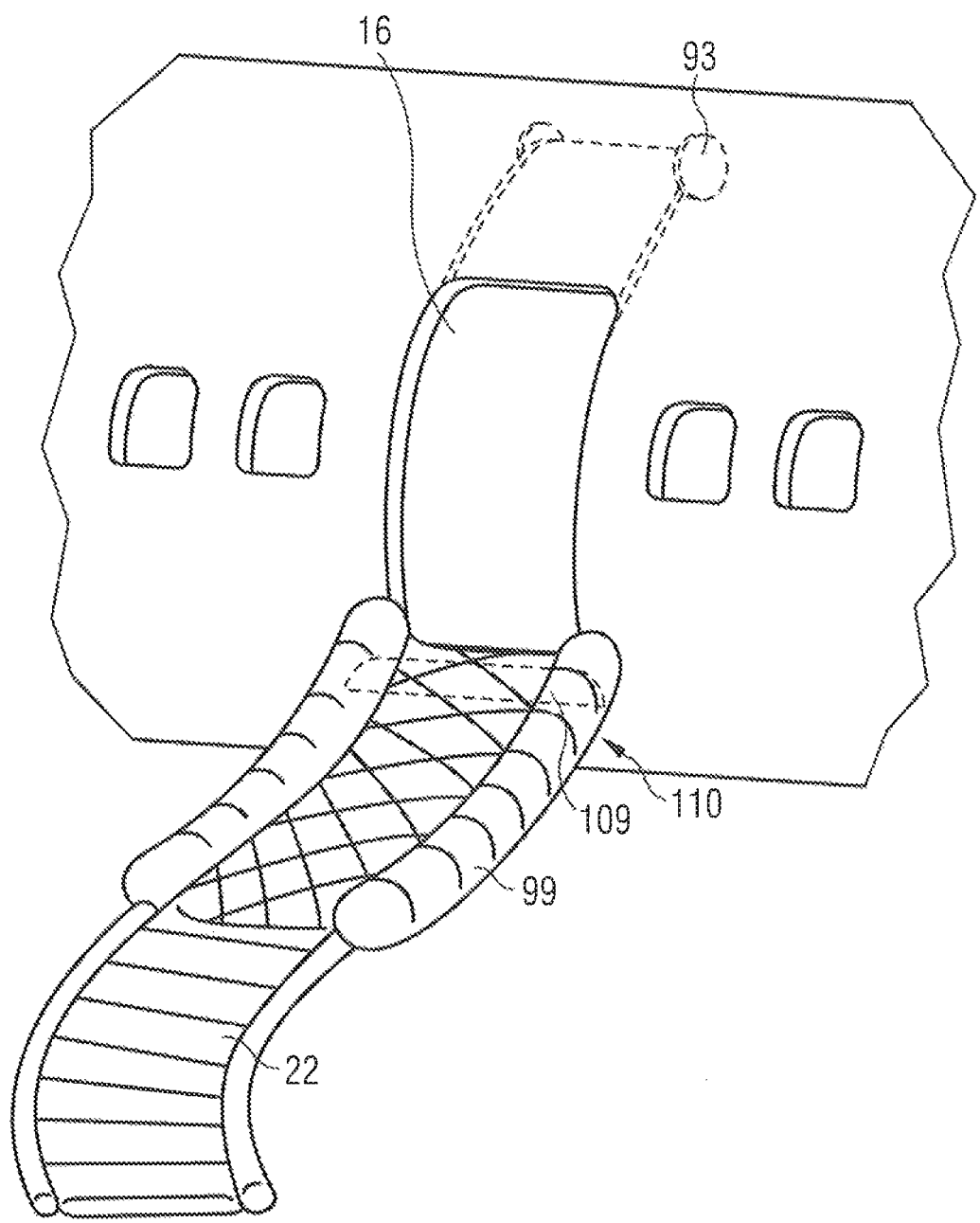
FIG. 9 shows a variant of the emergency exit system according to FIGS. 5a to c in the state installed in an aircraft.

Finally, the embodiment of the emergency exit system 10 that is shown in FIG. 9 differs from the arrangement according to FIGS. 5a to c in that the emergency exit system 10 furthermore comprises an activatable blocking element 99. The blocking element 99 is configured in order, during a movement of the door 22 from the closed position into the open position, to prevent shifting of the door 22 parallel to the first primary structure frame 12 and the second primary structure frame 14 in such a manner that, as illustrated in FIG. 9, the door 22 drops out of the aircraft 100. In particular, the blocking element 99 is in the form of an inflatable emergency chute which, in the inflated state, closes an opening 109 to a receiving space 110, which is arranged in the underfloor region 108 of the aircraft 100, for receiving the door 22 in the open position. Otherwise, the design and the function of the emergency exit system 10 shown in FIG. 9 correspond to the design and the function of the arrangement illustrated in FIGS. 5a to c.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An emergency exit system, comprising:
a first primary structure frame,
a second primary structure frame extending parallel to the first primary structure frame,
a door opening arranged between the first primary structure frame and the second primary structure frame,
a door movable parallel to the first primary structure frame and the second primary structure frame between a closed position and an open position,
wherein the door in the closed position closes the door opening and in the open position opens up the door opening,
wherein at least one of the first or second primary structure frames comprises a primary structure guide element configured to guide the door when the door is shifted between the closed position and the open position, and,
wherein the at least one of the first or second primary structure frames comprising the primary structure guide element is formed in two parts and comprises a first component comprising the primary structure guide element and a second component connected to the first component, and at least one of:
the first component comprising two support portions which extend parallel to each other and are connected to each other by a connecting portion extending perpendicularly to the support portions; or
the second component comprising a connecting portion which extends perpendicularly to support portions of the second component, which support portions extend from opposite surfaces of the connecting portion in opposite directions perpendicularly to the connecting portion.

2. The emergency exit system according to claim 1, wherein the primary structure guide element comprises at least one guide rail which extends from an inner surface of at least one of the first or second primary structure frames, said inner surface facing the door, in a direction of the door, and wherein, when the door is shifted between the closed position and the open position, a guide surface formed on the guide rail interacts with a surface of an edge portion of the door.

3. The emergency exit system according to claim 1, further comprising a releasable securing mechanism configured to secure the door in the closed position, wherein the securing mechanism comprises at least one of:
a clamping device configured to force the door in a direction of a clamping portion of the guide element and thereby to secure same in the closed position, or
a locking hook connected to the door and configured to interact with a structurally fixed, complementary locking hook.

4. The emergency exit system according to claim 3, wherein the clamping device comprises a bearing element arranged between the clamping portion of the guide element and a surface portion of the door, said surface portion interacting with the clamping portion.

5. The emergency exit system according to claim 1, wherein at least one of:
the door is shiftable from the closed position downward parallel to the first primary structure frame and the second primary structure frame relative to the door opening into the open position in a manner driven by gravity; or
the door is shiftable from the closed position upwards parallel to the first primary structure frame and the second primary structure frame relative to the door opening into the open position by means of a lifting mechanism.

6. The emergency exit system according to claim 5, wherein the lifting mechanism comprises at least one of:
a spring element which prestresses the door resiliently into the open position, wherein a spring force provided by the spring element is sufficient to keep the door in the open position after it has been shifted into the open position, or
a tension cable connected to the door and configured to be wound up onto a cable drum as the door is being shifted from the closed position into the open position, wherein the tension cable is guided by a guide device.

7. The emergency exit system according to claim 1, further comprising at least one of:
a stop element configured to interact with the door and to prevent a further shifting of the door relative to the door opening when the door has reached the open position;
a damping element connected to the stop element and configured to damp a stopping of a shifting movement of the door when the door has reached the open position; or
a locking device configured to lock the door in the open position.

8. The emergency exit system according to claim 1, wherein the door has a window which takes up 70 to 90% of an area of the door.

9. The emergency exit system according to claim 1, wherein the door is formed in multiple parts and comprises an upper part, a lower part and a central part arranged between the upper part and the lower part.

10. The emergency exit system according to claim 1, wherein the door is in a form of a flexible rolling door comprising a plurality of slats extending parallel to one another and a plurality of cords connecting the slats to one another.

11. The emergency exit system according to claim 10, wherein the door, in the form of a flexible rolling door, as the door is being shifted from the closed position into the open position, is configured to be wound up onto a receiving roller.

12. The emergency exit system according to claim 1, further comprising a pressure-tight membrane applied to an inner surface of the door and, in a state of the emergency exit system mounted in an aircraft, faces an interior of the aircraft.

13. The emergency exit system according to claim 1, further comprising an activatable blocking element configured in order, during a movement of the door from the closed position into the open position, to prevent the shifting of the door parallel to the first primary structure frame and the second primary structure frame such that, in a state of the emergency exit system mounted in an aircraft, the door drops out of the aircraft, wherein the blocking element is an inflatable emergency chute.

14. An aircraft comprising an emergency exit system according to claim 1.

15. An emergency exit system, comprising:
a first primary structure frame,
a second primary structure frame extending parallel to the first primary structure frame,
a door opening arranged between the first primary structure frame and the second primary structure frame,
a door movable parallel to the first primary structure frame and the second primary structure frame between a closed position and an open position, wherein the door in the closed position closes the door opening and in the open position opens up the door opening, wherein at least one of the first or second primary structure frames comprises a primary structure guide element configured to guide the door when the door is shifted between the closed position and the open position, and,
a releasable securing mechanism configured to secure the door in the closed position, wherein the securing mechanism comprises at least one of:
a clamping device configured to force the door in a direction of a clamping portion of the guide element and thereby to secure same in the closed position, wherein the clamping device comprises a bearing element arranged between the clamping portion of the guide element and a surface portion of the door, said surface portion interacting with the clamping portion, or
a locking hook connected to the door and configured to interact with a structurally fixed, complementary locking hook.

16. An emergency exit system, comprising:
a first primary structure frame,
a second primary structure frame extending parallel to the first primary structure frame,
a door opening arranged between the first primary structure frame and the second primary structure frame,
a door movable parallel to the first primary structure frame and the second primary structure frame between a closed position and an open position, wherein the door in the closed position closes the door opening and in the open position opens up the door opening, wherein at least one of the first or second primary structure frames comprises a primary structure guide element configured to guide the door when the door is shifted between the closed position and the open position, and,
at least one of:
a stop element configured to interact with the door and to prevent a further shifting of the door relative to the door opening when the door has reached the open position;
a damping element connected to the stop element and configured to damp a stopping of a shifting movement of the door when the door has reached the open position; or
a locking device configured to lock the door in the open position.

* * * * *